United States Patent

Malley

[15] 3,690,773

[45] Sept. 12, 1972

[54] DUAL PHOTOCONDUCTIVE CELL PHOTOMETER

[72] Inventor: Frank Malley, Gloucester Heights, N.J.

[73] Assignee: Unilex, Inc., Pennsauken, N.J.

[22] Filed: Nov. 19, 1970

[21] Appl. No.: 91,033

[52] U.S. Cl. ..................356/181, 356/186, 356/189, 356/206, 356/236
[51] Int. Cl.........G01j 3/46, G01j 3/48, G01n 21/22, G01j 1/04
[58] Field of Search......356/222, 184, 206, 229, 181, 356/186, 189, 236; 250/211

[56] References Cited

UNITED STATES PATENTS

| | | | |
|---|---|---|---|
| 3,549,261 | 12/1970 | Hach | 356/184 |
| 3,561,878 | 2/1971 | Kiess | 356/184 |
| 3,026,416 | 3/1962 | Weimer | 250/211 |

Primary Examiner—Ronald L. Wibert
Assistant Examiner—Conrad Clark
Attorney—Thomas Arthur Lennox

[57] ABSTRACT

A photometer for measuring the color of aqueous solutions such as polluted water with great sensitivity is provided. The photometer is portable, operates on a low power source, and retains sensitivity despite shock or drift of either the energy source or the light source.

The photometer utilizes photoconductive cells in a manner to eliminate the "light history" effect. A sample filter cell is placed between the lamp source and a regulating filter, which in turn is in front of a first cell, the second filter being designed to reduce the total light reaching the first cell. A second photoconductive cell is positioned to view light directly from the source and at the same time light reflected off of the sample filter. The cells are on opposite legs of a bridge circuit with each leg of the circuit being shunted around the cells to provide for drift control and balance. The bridge circuit is operated at low voltage across each photocell. The difference between the spectral response of the cells is balanced by the impedance of each leg circuit. The color intensity difference between sample filters is read directly on a microammeter across the bridge, the ammeter being chosen to provide as little impedance across the bridge as possible.

12 Claims, 3 Drawing Figures

INVENTOR.
FRANK MALLEY
BY
ATTORNEY.

DUAL PHOTOCONDUCTIVE CELL PHOTOMETER

BACKGROUND OF THE INVENTION

With the growing problems of water pollution, there is a need for accurate and inexpensive means for measuring the amount of chemicals in a particular water sample. A standard technique for determining for the presence of small amounts of soluble chemicals is by the addition of a standard reagent that reacts with the soluble chemical to form a new chemical compound with a distinct recognizable color. Reagent systems have been found that produce a color intensity proportional to the concentration of the chemical in the polluted water. These tests produce colors of all wavelengths of the spectrum. Although visual observations provide qualitative indications, much more precise determinations are now necessary due to the stricter anti-pollution laws and the necessity of close control of chemical treatments for feed to high pressure boilers. There are photometers that will measure the intensity of color but all suffer from major limitations. The prior photometers achieve sensitivity by resorting to cumbersome and delicate electronic amplifier and photomultiplier systems. The prior photometers utilize photovoltaic cells that require a high intensity light source with a cumbersome power source. The photovoltaic cells have limited sensitivity and amplifiers do not compensate for the electronic noise and other sensitivity limitations. Electronic amplifiers are also susceptible to drift that introduces reduced readout repeatability for the instrument. The amplifier systems require high battery drain and the equipment is not readily portable as the amplifier is susceptible to shock. The life of the high intensity lamps is short.

Photoconductive cells have not been effectively used in place of the photovoltaic cells in photometers for quantitative determinations. The photoconductive cells have been used for signalling on-off light intensity but not for accurate light "level" determinations due to the well known "hysteresis" or "light history" effect. This effect is caused by the cell's inability to immediately return to the equilibrium condition of darkness. Continued readings of the same constant light source provide higher and higher and more inaccurate apparent emission readings especially when light source is intermittent as required in a photometer. In Photocell Design, Theory and Application, 25 CL 1166; Copyright 1966, a technical manual by Clairex Corp., 1239 Broadway, N.Y.C., 10001, a leading manufacturer of photoconductive cells, it is stated on page 6, that "The 'light history effect' (preferred term) is a definite hindrance in the use of photo-conductive cells for the measurement of light levels. For the continuous measurement of light levels which may range in a random manner from darkness to very high light levels, precision is limited at any light level to the magnitude of the 'light history effect' for that level.

"For intermittent measurements, the effect of 'light history effect' may be virtually eliminated by keeping the cell in a constant light environment between measurements. For best results, a light level environment within the range of interest should be choses." Of course this solution is not practical in a photometer.

SUMMARY OF THE INVENTION

This invention relates to photometers and colorimeters. The photometer of this invention measures light intensity within a determined wave length range, the range being determined by the choice of filters in the photometer. The wave length range chosen for measurement may be within, partially within or wholly outside the visual spectrum. More particularly this invention relates to a photometer with great sensitivity. This sensitivity is obtained without resorting to a cumbersome and delicate amplifier and without photomultiplier systems. The present invention allows the use of a small light source with a low power drain in a particular photometric design. Fine sensitivity is obtained with the present invention, wherein the relative transmittance of a sample filter is measured by the current flow dependent on light readings of two photoconductive cells which minimizes any error. The present photometer is indeed portable in the true sense of the word, as it is small, light in weight, and not susceptible to shock as would be a system utilizing a photomultiplier vacuum tube. Although the entire photometer may be powered with standard flashlight cells and the light source may be a standard flashlight lamp, the sensitivity of the instrument equals or is better than that obtained from existing photovoltaic instruments presently available. Prior art systems have required special lamps designed to provide a constant output. The present invention eliminates any concern as to the drift in the power source or the light source, as the circuit compensates internally for any drift.

These objects and other advantages, that will become clear through a reading of the entire specification, are obtained by positioning a sample filter and an adjustment filter in optical alignment in that order between the light source and a photoconductive cell. The adjustment filter is designed to reduce the total light transmitted through the filter sample and is also designed to correct the light passing through the sample filter to a certain wave length range to be measured. Prior photometers utilizing a photovoltaic cell require a high light intensity impinging on the cell such that this type of filter system is not feasible.

Great sensitivity, precision and freedom from drift is obtained by positioning a second photoconductive cell to receive light directly and unfiltered from the light source, while at the same time receiving light reflected from the filter sample. These cells are placed in a light ratio-responsive electrical circuit that compensates for differing spectral responses and provides a reading directly proportional to the color-light transmission of the filter sample.

Preferred is a circuit which not only compensates for the differing spectral response, but also for any drift in the power or light sources. The system is a special bridge circuit having each cell on opposite legs of the circuit with a microammeter measuring the current across the bridge. The balancing of the two spectrally out-of-phase cells is accomplished with impedence of each leg circuit. Each cell is shunted with impedence lower than that of the cell in a dark condition to further increase the sensitivity of the photometer. The microammeter is chosen so as to have as low impedence as possible without upsetting the balance of impedence in the leg circuits.

A particular utility for this photometer is the measurement of the color differences between fluid samples resulting from a chemical reaction and particularly water chemistry. The filter sample in these instances is a cell into which the chemical reagents are placed. The photometer is particularly useful in determination of the amount of impurities in waste water as a measure of pollution. The photometer is useful in the measure of even small changes in the concentration of impurities and is as accurate as the chemical reaction causing the change in the color of the liquid sample. The photometer is also used to measure the amount of turbidity, that is, the amount of suspended solids in a liquid sample.

THE DRAWINGS

Figure 1:
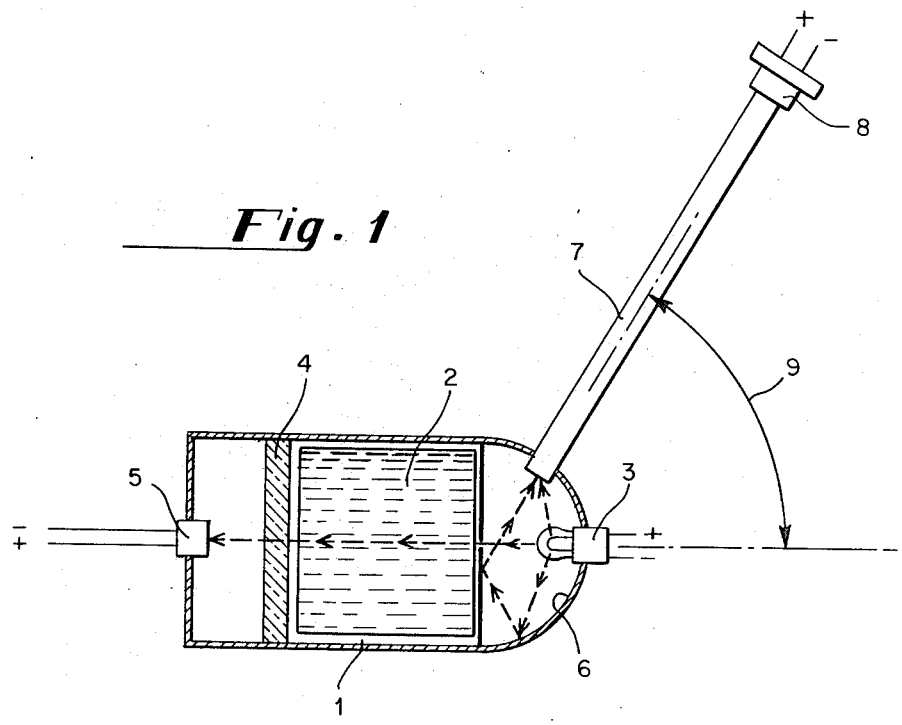
FIG. 1 is a schematic drawing representing an illustrative embodiment of the optic system of the photometer of the invention.

In the illustrative optic system shown schematically in FIG. 1 the sample filter is a sample holder 1, which is usually transparent to the radiation of source lamp 3. The sample fluid 2 for which the color intensity is to be measured is placed in sample holder 1. The sample holder is positioned so that the emission from lamp 3 passes through the sample fluid 1 and then through regulating filter 4. In an example the sample fluid is pale purple and filter 4 is green with a peak transmittance in the range of 500 to 550 $\mu$ and a total light transmittance of 10 to 20 percent. The light passing through both the sample fluid and the filter impinges on the sensitive surface of photoconductive cell 5. A parabolic reflector 6 is placed around the lamp source and in such a fashion as to collect the light reflected from the sample fluid and the sample holder. The frontal surface of a fiber optic light pipe 7 is placed in a small penetration in the reflector at an angle to the optical alignment between the lamp and cell 5, and is positioned such that the light being transmitted along the fiber will be directly from the lamp source 3 and also reflected from the sample fluid 2. The light is transmitted along optic fiber 7 to the sensitive surface of photoconductive cell 8, which is connected with photocell 5 to a means for measurement of the light transmitted through sample fluid 2. The optic fiber in this illustration is at 55 degrees angle to the alignment path of the light from the source through the sample fluid, but this angle may be varied depending upon the construction of the means to transmit the light to cell 8 and the shape of the reflector.

Figure 2:
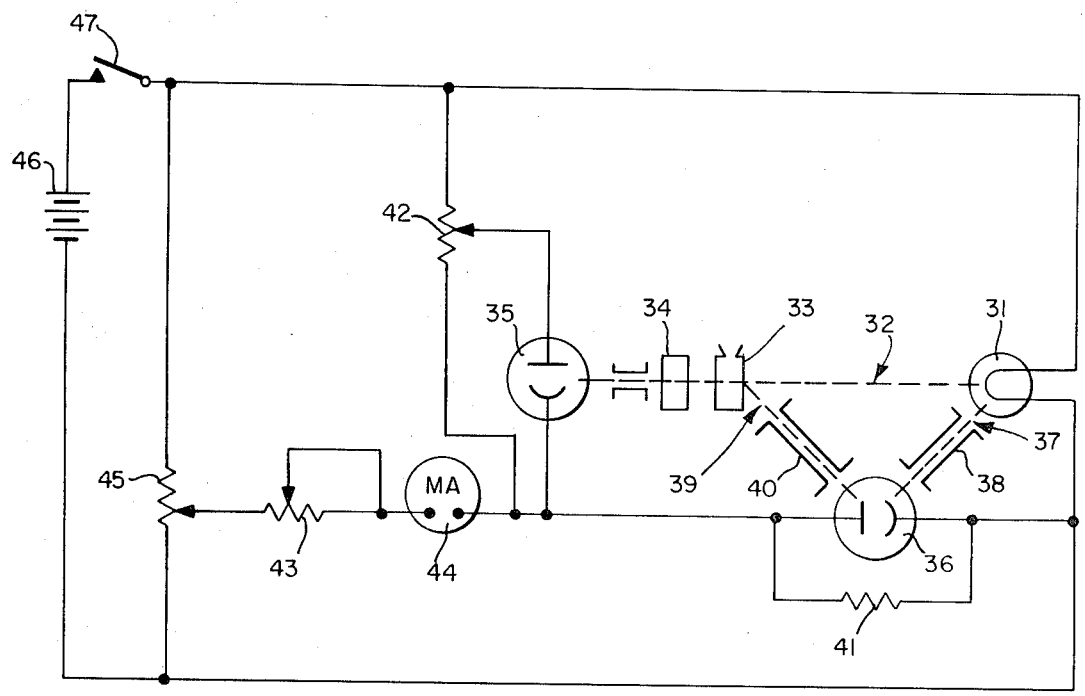
FIG. 2 is a circuit and schematic diagram of an embodiment of the photometer in accordance with the invention.

In FIG. 2 a typical electrical circuit along with a schematic representation of the optic system is provided. Radiation from 1.35 watt lamp 31 passes along light path 32 through the sample holder 33 containing colored fluid and then through regulator filter 34 and finally strikes the sensitive surface of a bulk effect cadmium sulfide photoconductive cell 35 that provides 9,000 ohms at 2 foot-candles and 600,000 ohms in the dark (Clairex-CL-5M5; peak response 550 $\mu$).

Photoconductive cell 36, another photoconductive cell similar to cell 35, is provided with means 38 to receive direct radiation from lamp 31 along light path 37 as well as means 40 by which reflected radiation from sample holder 3 is received along light path 39. Photoconductive cell 36 is shunted by electronic circuitry consisting of 500 ohm resistor 41 and 0 to 5,000 ohms locking variable resistor 43, milliammeter 44 and 0 to 5,000 ohms-10 turn variable resistor 45. The microammeter 44 has a full swing of 0 to 25 microamps over 4½ inches with an internal impedance of 1,690 ohms. Present technology makes it difficult to obtain an ammeter with low impedance and while is is recommended that this impedance be as low as possible, the system may be balanced for a microammeter with an internal impedance of about 1,000 ohms. For laboratory bench photometers an eight inch swing ammeter is preferred for maximum precision. This circuitry prevents the dynamic resistance of photoconductive cell 36 from exceeding 500 ohms impedance, regardless of the light level being transmitted through the fiber optic system. Photoconductive cell 35 is shunted by electronic circuitry consisting of 0 to 5,000 ohms locking variable resistor 42, 0 to 5,000 ohms locking variable resistor 43, microammeter 44, and variable 10-turn 0 to 5,000 ohms resistor 45. This electronic circuitry limits the high impedance of photoconductive cell 35. Adjustable resistor, commonly known as a potentiometer, 42 is adjusted to permit photoconductive cell 45 to appear as a matched impedance to that of photoconductive cell 36 to compensate for difference in batch to batch variation between cells and source. When locked, the circuit then compensates for drift. Photoconductive cells 35 and 36 are not matched impedance-wise electrically, but are matched in such a manner as to appear balanced across potentiometer 45. The potentiometer is directly across the power source thus the total drain is as low as possible. This is necessary to compensate for the radiant energy from lamp 31 being absorbed by the sample filter 33. Variable resistor 42 functions as stability for anti-drift control and is adjusted to balance the current in each leg. When adjusted for the above conditions it permits the circuitry to compensate for the drift of lamp 31 due to temperature, spectral shift and/or varying light output. Variable resistor 42 also permits the replacement of lamp 31 without a burn-in period for stabilizing the output, which is generally required of tungsten lamps when used as a light source for prior photometric instruments. Push-button switch 47 allows the photometer to be activated from the 4.5 volt power source 46. Although many of the particular resistance levels are not critical, the shunt resistor 41 is chosen to be just higher than the resistance of the cell when the emission source is on. If this resistance is too low, the sensitivity of the cell and thus the photometer is lower. The entire circuit operates at 0.045 watt while the source lamp operates at 1.35 watts.

Figure 3:
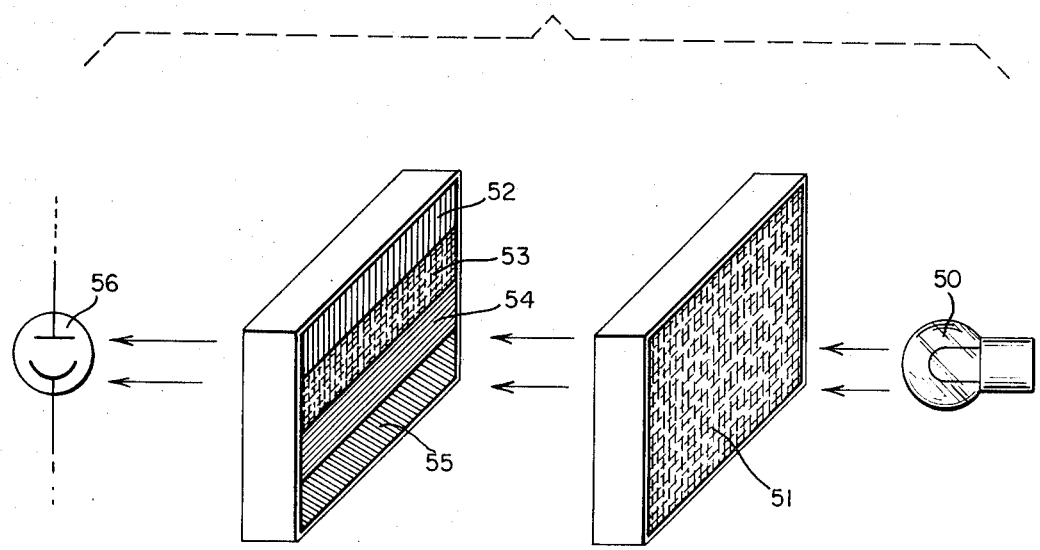
FIG. 3 is a schematic drawing of a multi-color regulating filter that offers particular versatility with the invention.

An illustrative filter system shown schematically in FIG. 3 is a multi-colored regulator filter placed between the amber liquid sample and the photoconductive cell 56 along the optical path from light source 50. The radiation from light source 50 passes through the amber liquid sample 51 into the multi-colored filter composed of four separate colored filters of a red filter 52, a yellow filter 53, a blue filter 54, and a green filter 55 placed in a fashion so that the light being transmitted through the amber sample can partially pass through either one or all of the individual colored filters depending upon the color intensity of the sample and the color of the regulator filter. The advantage of this type of regulator filter is that it is a multi-purpose filter that need not be replaced for every chemical reaction and use. The colored filters in this example have the following peak wave length transmittances and total light transmittance.

| Color | Peak Transmittance ($\mu$) | Approximate Total Light Transmittance |
| --- | --- | --- |
| red | 660–700 | 30 |
| yellow | 600–700 | 60 |
| blue | 450 | 15 |
| green | 450 and 600 | 30 |

DETAILED DESCRIPTION OF THE INVENTION

The present invention provides a photometer that offers great sensitivity, portability, durability and a low power drain. The radiation energy being measured is dependent on the amount of light passing through the sample filter with the reading on the two photoconductive cells minimizing any error. The photometer of this invention is operated on direct current such as from a battery or from normal 110 volt alternating current through a rectifier. An advantage over the photovoltaic systems presently used is that the sensitivity of the present invention allows a small color change to result in a large change in the signal output at the microammeter. The photometer of this invention may be modified to a tri-stimulus color recording instrument with the standard three filters to measure the tri-stimulus values of the color samples. The photometer may also be adapted to measure the intensity of a light source, such that the filter system is directed to the source to measure the color output, thereby acting as a probe.

The use of photoconductive cells and the order of positioning of the sample filter and the regulator filter between the cell and the light source are critical to this invention. The radiation from the light source impinges on the filter sample, part of the radiation being transmitted through it and the adjustment filter to one of the photoconductive cells. Some of the radiation is reflected off of the sample filter and directly to a second photoconductive cell, which also receives radiation directly from the source. Light ratio-responsive electronic circuitry then measures the difference between the light striking these two cells and measures directly the light transmitted through the sample filter. The photoconductive cells may respond to different wave lengths, but both responses must be within the wave length range of the radiation from the source.

The regulating filter or filters are examples of means for correcting the radiation transmitted through the sample filter to a relatively narrow band or window of wave lengths. The effect of this means to regulate the light transmitted is not only to reduce the intensity of the light, but also to restrict the radiation reaching the photocell to a relatively narrow band. The further effect of the regulating filter is to effect a large proportional change in radiation reaching photocell for only a slight change in the color intensity of the sample filter to be measured. For example when the amount of phosphates in a cooling tower water sample is to be measured a reagent is added which yields a pale purple color directly proportional to the concentration of the polyphosphate. The purple color has peak transmittance values at 420 $\mu$ and 700 $\mu$ in the visible spectrum. The choice of a green adjustment filter with a peak transmittance at 535 $\mu$ essentially cuts off transmittance above 600 $\mu$. The reduced transmittance through both filters is in the blue range and only minor changes in the intensity of the sample filter cause large proportional changes in the intensity reaching the photocell. A convenient determination of the effectiveness of the adjustment filter is the shape of window. The narrower and higher this window is, the greater the sensitivity. It is preferable that the ratio of the height of this window in percent transmittance to the width of the base of this window in $\mu$ be greater than 0.2 and more preferably greater than 0.3.

The photocell receiving the radiation through the two or more filters must be the photoconductive type, preferably bulk effect. This first photocell is responsive to the portion of the spectrum that is transmitted through the filters. It is generally preferred that this first photocell be responsive to a broad spectrum to allow versatility of the photometer without changing the photocell. However, this photocell may be chosen to be particularly responsive to the certain wave length range which will impinge on it after passing through the filters. In particular this photocell is chosen to be responsive in the wave length range of the window or band within which a major proportional change in intensity and color will occur with a small change in the intensity of the sample. A large proportional change can occur due to the slope of the spectrophotometric transmittance curve of this window between the sample and the adjustment filter depending on the choice of the adjustment filter.

The second photoconductive cell receives radiation both directly from the light source and reflected off the sample filter. This second cell is preferably chosen to be most responsive to those wave lengths to which and in which the light source will drift or age, but its response may be as broad as the first cell.

An embodiment of the invention utilizes a standard flashlight lamp, although fluorescent or neon sources suffice, fixed within a reflector in a position so that the direct emittence from the lamp passes through the sample filter and the regulator filter to the photocell. The sample filter consists of a glass cell into which is placed a fluid that is the reaction product of a chemical reaction, such as a reaction to measure the impurities in the water of a boiler which must be carefully controlled to eliminate corrosion and stay within the pollution limitations. If this liquid sample is blue in color of varying intensities, depending on the pollutant level, a red filter is chosen to measure the change in the color of the sample. One skilled in the art can easily choose a regulator filter match to provide an accurate measurement depending on the color range of the sample fluids. Useful filters that may be employed are colored glass, colored acrylic sheet and other plastic filters. Because of low intensity light source, less permanent filters may be used since there is no thermal or high intensity radiation to cause degradation of the filters.

In this embodiment the radiation from the lamp not only penetrates the sample, but also falls upon a reflector, shaped roughly as a parabola. The reflector is equipped with a small penetration, which is located at an angle from the optical alignment through the filters. This angle is chosen to provide a position to which both light directly from the source and light reflected from the sample filter may be received. A fiber optic light pipe is inserted in the penetration, in such a manner that the radiation from the lamp impinges directly on the surface of the fiber and also the reflection from the sample holder and the liquid sample falls on the frontal surface of the fiber. All of this radiation is transmitted through the fiber and falls on the sensitive surface of the second photoconductive cell. As an alternative the second cell may be embedded directly in the penetration in the reflector.

The photoconductive cells need not be sensitive to only visible light and the photometer of this invention may be adapted to the measurement of ultraviolet and infrared light transmittance. In that instance the first photoconductive cell would be sensitive to ultraviolet light, while the photoconductive cell receiving light directly from the source might be chosen to be sensitive to wave length significantly different from that of the ultraviolet range. Sensitivity to visible red light would be satisfactory. Thus in general, the particular choice of the color of the filter and the particular choice of the sensitivity of each of the photocells is dependent upon the sample to be measured and the source of illumination utilized.

The means of the optic system to allow the photocell to receive direct radiation from the source is not critical. However, the fiber optic system does indeed provide a convenient arrangement of the two photoconductive cells in a physical location remote from the lamp source. This eliminates the effect of the heat generated from the lamp source on the operation of the photoconductive cells. This photo optic system also permits the encapsulation of the photocells and permits the sealing of the entire electrical system hermetically.

The two photocells are connected through a light ratio-responsive electrical circuit that provides means to compensate for the drift in the light source taking advantage of the difference in the spectral response of the photoconductive cells to obtain great sensitivity and to measure the relative transmittance of the light passing through the sample filter directly.

A particular bridge circuit has been discovered to satisfy these needs and in combination with the optic system provides a highly sensitive photometer. This bridge circuit compensates for any change in the power source allowing it to be an inexpensive and uncontrolled standard battery system. Changes in the power source output do not appear on the photocells as a change in the light through the sample filter. As tungsten filament lamps age, there is a significant change in their spectral output color and intensity. Again the bridge circuit of this invention compensates for any drift and allows inexpensive lamps to be used without any elaborate control or break in period for the lamp source. The bridge circuit has each cell on a separate leg of the bridge with the current being measured across the bridge as directly proportional to the light passing through the sample filter. The impedance of each leg circuit balances the two spectrally out-of-phase cells. The photoconductive cells are not matched impedance-wise, but are matched in the legs to appear balanced across the potentiometer of the bridge. Further, each photoconductive cell is shunted by an impedance to increase the stability and act as an anti-drift control. A fixed shunt resistance across one of the photocells limits the maximum impedance that the photocell can reach. As the variable shunt resistance across the photocell is reduced, the resistance in the leg containing that photocell is increased, thereby compensating and balancing the impedance of the bridge. The circuit may be modified in a variety of ways which will occur to one skilled in the art; however, one useful modification is to replace the cells in FIG. 2, such that the first cell is sensitive to ultraviolet and the second is sensitive to infrared. Best results are obtained when each cell is identical in peak spectral response with both reacting to a relatively broad range of wave lengths.

Most ammeters have an internal impedance of at least 5,000 ohms. It has been found that the reduction in this internal impedance greatly improves the sensitivity of the instrument. The lower the impedance, the greater the swing on a microammeter for a small current change. It is therefore desirable to utilize an ammeter with as low impedance as possible. Present technology allows the custom construction of microammeters with an internal impedance of about 1,700 ohms. For greater sensitivity it is desirable to utilize an ammeter with an impedance of about 1,000 or even lower. As the impedance is increased towards 2,000, reduced sensitivity is observed. The only known lower limit for the internal impedance of the ammeter is that it should not be any lower than the impedance of the bridge leg.

Thus, in this circuit, the first cell receiving radiation through the filters is shunted in one leg of the circuit by a variable resistor anti-drift control adjusted during instrument alignment to compensate for the spectral shift of the source lamp, a series resistor with the ammeter to align the sensitivity of the meter so that the swing is within the sample concentration range, a front panel adjustable resistor to bring the ammeter to zero reading for the reagent blank, and the ammeter. The second cell receiving direct and reflected radiation from the source is shunted on the other leg of the bridge circuit by a resistor to prevent the dynamic resistance of the cell from exceeding a set value, the same anti-drift control resistor, the same front panel adjustable resistor, and the ammeter.

The distance from the light source which permits about 1 candle power to the first photocell is about 2.5 inches. However, the foot-candles that reach the cell are quite small due to the near blackout characteristics of the filter combination. The current is adjusted to provide only 2 foot-candles and the resistance of the first photocell is 9,000 ohms. Inserting a red 640 $\mu$ filter in the light path changes the resistance to 40,000 ohms while the green 535 $\mu$ filter changes the resistance to only 20,000 ohms. This factor of two between these filters illustrates the great sensitivity possible in the photometer. Measurements to one-tenth part per million calcium or magnesium ions is possible in water hardness tests.

Another way of describing an aspect of this invention is in relation to the photoconductive cells. As explained above, the "light history effect" in these cells has heretofore prevented the use of these cells in measuring photometers. This invention has provided a method for using these cells. The explanation for the phenomenon has not yet been definitely proven. However, it appears that the combination of low light levels reaching the cells alone or in combination with the low voltage applied to the cells through the circuit eliminates the "light history effect." Both of these values are many orders of magnitude lower than recommended. There were no known uses for these cells at either low voltage or low illumination. The preferred upper limits to this method of using a photoconductive cell to eliminate hysteresis is an illumination less than about 2 foot-candles, preferably less than 1, and voltage across the cell less than 10 volts, preferably less than about 5.

I claim:

1. An electrical photometer comprising
   a radiation source,
   a first photoconductive cell in position to respond to changes in the level of intensity from said radiation source,
   a filter sample in the radiation path between said source and said first cell,
   a chromatic filter control means in the radiation path between said filter and said first cell to reduce the radiation intensity level reaching said cell to a sufficiently low level so as to essentially eliminate the hysteresis effect common to photoconductive cells,
   a second photoconductive cell with means for providing radiation to said second cell both directly from the radiation source and reflectedly from the radiation source off of the filter sample,
   and a series adding circuit means for measuring a difference in the conductive response between the two cells, so that the difference between the responses is directly proportional to the color intensity of the sample cell.

2. The photometer of claim 1 wherein the filter sample is the colored liquid product of a chemical reaction with pollutants in water wherein the color intensity of the product is proportional to the concentration of the pollutant to be measured.

3. The photometer of claim 1 wherein the control means is chosen to adjust the radiation reaching the first cell to be essentially monochromatic.

4. The photometer of claim 3 wherein the control means is at least one colored filter, the color of the filter being chosen to absorb essentially all of the source radiation at the wave lengths of the peak transmission of the sample filter.

5. The photometer of claim 1 wherein the control means is chosen to lower the radiation level reaching the first cell to intensity below 2 foot-candles.

6. The photometer of claim 1 wherein the control means is chosen to lower the radiation level reaching the first cell to intensity below one foot-candle.

7. The photometer of claim 1 wherein the means for providing radiation to the second cell comprises a reflector around the radiation source, with a penetration in the reflector into which the second cell is placed in a position to receive a combination of radiation from the source and reflected radiation from the surface of the sample filter.

8. The photometer of claim 1 wherein the circuit means is a direct current electrical bridge circuit with each of the cells located on opposite legs of the bridge circuit wherein unbalancing of the bridge produces a current flow change within the bridge that is proportional to the color intensity of the sample filter.

9. The photometer of claim 8 wherein the unbalancing of the bridge circuit is measured by a microammeter in the bridge, said microammeter having as little internal impedance as possible as long as it does not shunt any of the legs of the circuit.

10. The photometer of claim 8 wherein the microammeter has an internal impedance in the range of about 700 to 1,800 ohms.

11. The photometer of claim 8 wherein the bridge circuit has at least one cell shunted with a variable resistor to insure that the resistance of the whole leg of circuit is in balance with the other leg to act as an anti-drift control.

12. The photometer of claim 11 wherein in the bridge circuit the first cell is shunted with a variable resistor as anti-drift control and the second cell is shunted with a resistor just higher in impedance than that of the second cell when the source is on.

* * * * *